(12) United States Patent
Miyashita

(10) Patent No.: US 9,039,193 B2
(45) Date of Patent: May 26, 2015

(54) ELECTRO-OPTIC MODULE AND ELECTRONIC APPARATUS

(75) Inventor: Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 230 days.

(21) Appl. No.: 13/602,729

(22) Filed: Sep. 4, 2012

(65) Prior Publication Data

US 2013/0077058 A1    Mar. 28, 2013

(30) Foreign Application Priority Data

Sep. 26, 2011  (JP) ................. 2011-208668

(51) Int. Cl.
*G03B 21/28* (2006.01)
*H04N 9/31* (2006.01)
*G02F 1/1333* (2006.01)
*G02F 1/1335* (2006.01)
*G03B 21/00* (2006.01)
*G03B 21/16* (2006.01)

(52) U.S. Cl.
CPC ........ *H04N 9/3105* (2013.01); *G02F 1/133385* (2013.01); *G02F 1/133512* (2013.01); *G03B 21/006* (2013.01); *G03B 21/16* (2013.01); *H04N 9/3144* (2013.01)

(58) Field of Classification Search
CPC ........ G03B 21/16; G03B 21/18; G03B 21/26; H04N 5/74
USPC ................. 353/80, 57; 359/629, 246
See application file for complete search history.

(56) References Cited

U.S. PATENT DOCUMENTS 6,819,464 B2 *  11/2004  Fujimori et al. ............... 359/246
7,365,821 B2 *   4/2008  Dewa et al. .................... 349/161

FOREIGN PATENT DOCUMENTS

JP          2005-196027 A         7/2005

* cited by examiner

*Primary Examiner* — William C Dowling
*Assistant Examiner* — Jerry Brooks
(74) *Attorney, Agent, or Firm* — ALG Intellectual Property, LLC

(57) ABSTRACT

A first light-transmissive plate is provided on an opposite surface of a first substrate of an electro-optic panel to a second substrate. The first light-transmissive plate is smaller than the first substrate, and an end portion of the first substrate is exposed from the first light-transmissive plate. In addition, a heat radiation member made of a metal material is provided so as to be overlapped with the exposed portion from the first light-transmissive plate of the first substrate.

10 Claims, 9 Drawing Sheets

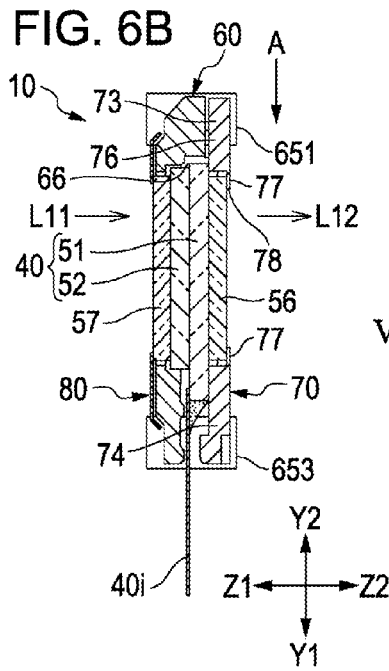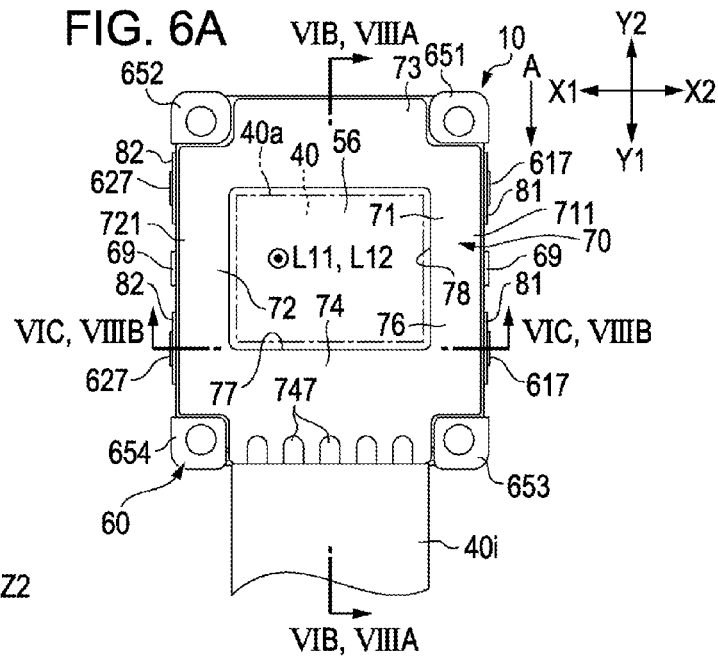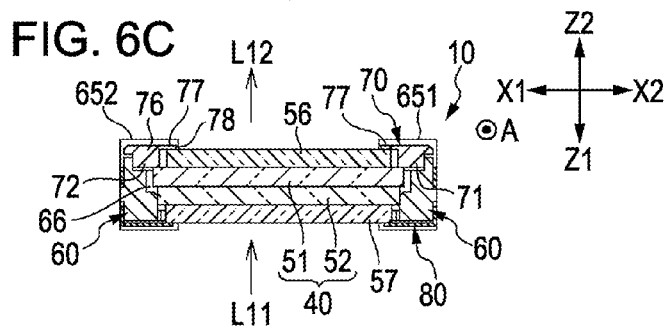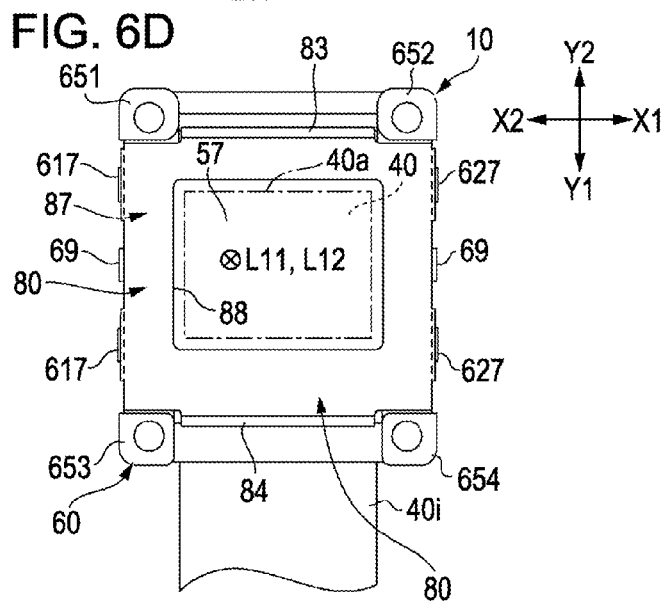

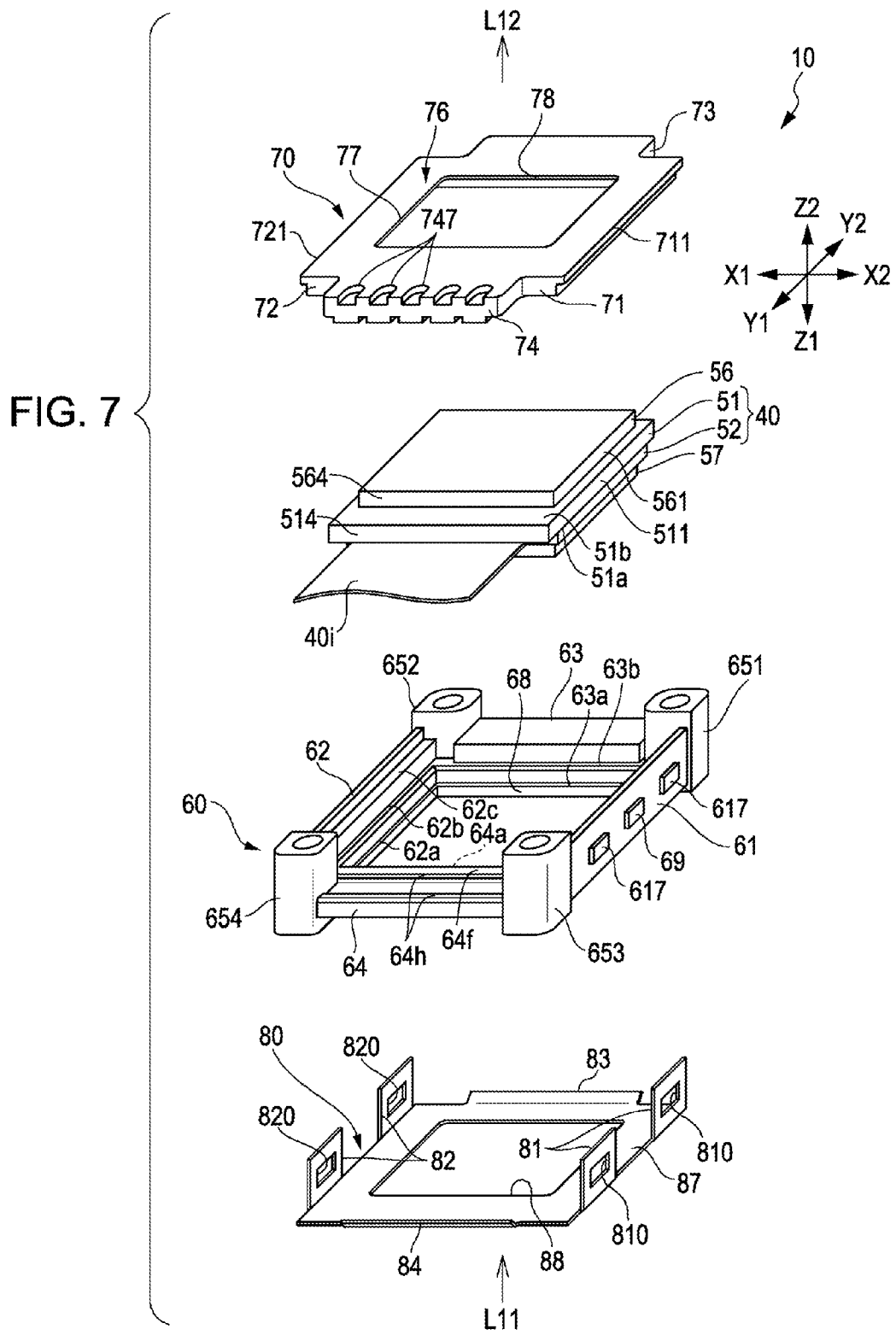

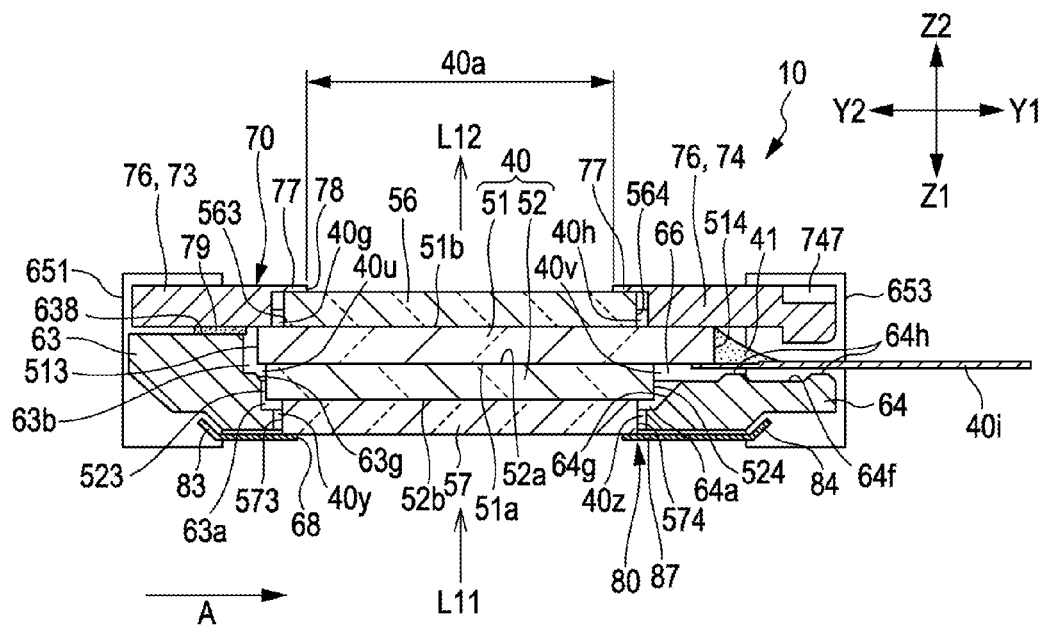

ELECTRO-OPTIC MODULE AND ELECTRONIC APPARATUS

BACKGROUND

1. Technical Field

The present invention relates to an electro-optic module which is used in electronic apparatuses such as projection type display devices and an electronic apparatus including the electro-optic module.

2. Related Art

When an image is displayed in an electronic apparatus such as a projection type display device, light that is modulated by an electro-optic panel such as a liquid crystal panel is used. The electro-optic panel has a configuration in which an electro-optic material layer is provided between a first light-transmissive substrate and a second light-transmissive substrate, and is used in a state of being fixed to a casing such as a frame body by an adhesive. For example, in JP-A-2005-196027, a structure in which a frame that forms a metal film on a surface of a resin body such as a polycarbonate resin is used as the casing, and a high thermal conductivity mold resin is used as the adhesive has been disclosed.

However, as in a configuration described in JP-A-2005-196027, even when the high thermal conductivity mold resin is used as the adhesive for fixing the liquid crystal panel to the frame, thermal conductivity of the high thermal conductivity mold resin is lower than that of a metal, or the like, and therefore there is a problem that heat generated in the liquid crystal panel cannot be efficiently released. In addition, in the frame that forms the metal film on the surface of the resin body, thermal conductivity of the frame is low, and therefore there is a problem that the heat generated in the liquid crystal panel cannot be efficiently released.

SUMMARY

An advantage of some aspects of the invention is to provide an electro-optic module that efficiently releases heat generated in an electro-optic panel, and an electronic apparatus that includes the electro-optic module.

According to an aspect of the invention, there is provided an electro-optic module including: an electro-optic panel that includes a first light-transmissive substrate, a second light-transmissive substrate arranged so as to face the first substrate, and an electro-optic material layer provided between the first substrate and the second substrate; a first light-transmissive plate that is overlapped on an opposite side of the first substrate to the second substrate in at least an image display region of the electro-optical panel in a state in which a portion of an opposite side surface of the first substrate to the second substrate is exposed; and a heat radiation member that is provided so as to be overlapped on the opposite side of the first substrate to the second substrate in at least a part of an exposed portion from the first light-transmissive plate of the first substrate, and is made of a material higher in thermal conductivity than the first light-transmissive plate.

In addition, "transmittance" in the invention denotes having transmittance for light to be modulated or light to be transmitted.

In the invention, on the surface of the opposite side of the first substrate to the second substrate, the first light-transmissive plate is provided so as to be overlapped with the image display region, and therefore dust hardly adheres to a position (the first substrate) close to the electro-optic material layer. Accordingly, even when projecting an image generated in the electro-optic panel, effects of dust hardly reach the image. Here, the first light-transmissive plate is provided so as to expose the part of the opposite surface of the first substrate to the second substrate, and the heat radiation member that is made of material having higher thermal conductivity than that of the first light-transmissive plate is provided so as to be overlapped in at least the part of the exposed portion from the first light-transmissive plate of the first substrate. For this reason, the heat generated in the electro-optic panel may be efficiently released through the heat radiation member, thereby suppressing a deterioration in display quality caused by an increase in a temperature of the electro-optic panel.

It is preferable that the heat radiation member be made of a metal. According to the above-described configuration, the thermal conductivity of the heat radiation member is high, therefore the heat generated in the electro-optic panel may be efficiently released through the heat radiation member.

It is preferable that the first light-transmissive plate have a smaller size than that of the first substrate, an end portion of the first light-transmissive plate be arranged between an end portion of the first substrate and an end portion of the image display region over the whole periphery of the first light-transmissive plate in plan view, and the heat radiation member be provided so as to surround the whole periphery of the first light-transmissive plate. According to the above-described configuration, an overlapped area between the exposed portion from the first light-transmissive plate of the first substrate and the heat radiation member is large, and therefore the heat generated in the electro-optic panel may be efficiently released through the heat radiation member.

It is preferable that end portions of the first light-transmissive plate and the heat radiation member which face each other be spaced apart from each other. According to the above-described configuration, the heat radiation member does not impose an excessive load to the first light-transmissive plate even though the heat radiation member is contracted due to a reduction in temperature, and therefore a situation in which the electro-optic panel is deformed due to stress from the first light-transmissive plate which is imposed on the electro-optic panel may be avoided.

It is preferable that the heat radiation member include a parting portion that is overlapped to a surface of an opposite side of the first light-transmissive plate to the first substrate.

In this case, it is preferable that a thickness of the parting portion be smaller than a thickness of a portion that is overlapped with the exposed portion of the first substrate in the heat radiation member. According to the above-described configuration, cooling air enters an opening surrounded by the parting portion and flows in an uninterrupted manner. Accordingly, it is possible to release the heat generated in the electro-optic panel to the cooling air through the first light-transmissive plate. In addition, the cooling air enters the opening in an uninterrupted manner, and therefore it is possible to prevent dust from being adhered to the first light-transmissive plate.

It is preferable that on the second substrate side of the first substrate, a frame for holding the electro-optic panel be provided between the first substrate and the heat radiation member so as not to be overlapped with at least the image display region may be adopted. In the aspect of the invention, "hold" refers to a configuration in which the heat radiation member and the frame hold the electro-optic panel through another member in addition to a configuration in which the heat radiation member and the frame directly hold the electro-optic panel.

It is preferable that the electro-optic module further include a second light-transmissive plate that is superimposed on an opposite side of the second substrate to the first substrate in at least the image display region of the electro-optical panel in a state in which a part of an opposite side surface of the second substrate to the first substrate is exposed, wherein end portions of the second light-transmissive plate and the frame which face each other are spaced apart from each other.

It is preferable that the first substrate be an element substrate including a pixel electrode and a switching element provided to correspond to the pixel electrode may be adopted. When light is transmitted through the electro-optic panel, heat generation in the element substrate on which the pixel electrode and switching element are formed is larger than that in the second substrate, but according to the aspect of the invention, it is possible to efficiently release the heat generated in the first substrate through the heat radiation member.

It is preferable that the electro-optic panel be, for example, a liquid crystal panel including a liquid crystal layer as the electro-optic material layer.

The electro-optic module according to the aspect of the invention may be used in a variety of electronic apparatuses. In addition, when a projection type display device is configured as the electronic apparatus, the electronic apparatus may include a light source unit that emits light supplied to the electro-optic module; and a projection optical system that projects light modulated by the electro-optic module.

BRIEF DESCRIPTION OF THE DRAWINGS

The invention will be described with reference to the accompanying drawings, wherein like numbers reference like elements.

FIGS. 6A, 6B, 6C, and 6D are explanatory diagrams illustrating an electro-optic module used in a projection type display device to which the invention is applied.

FIG. 7 is an exploded perspective view obtained when a state in which an electro-optic module used in a projection type display device to which the invention is applied is exploded is viewed from a light-emitting side.

FIGS. 8A and 8B are explanatory diagrams illustrating an enlarged cross-sectional configuration of an electro-optic module used in a projection type display device to which the invention is applied.

DESCRIPTION OF EXEMPLARY EMBODIMENTS

Figure 1A:
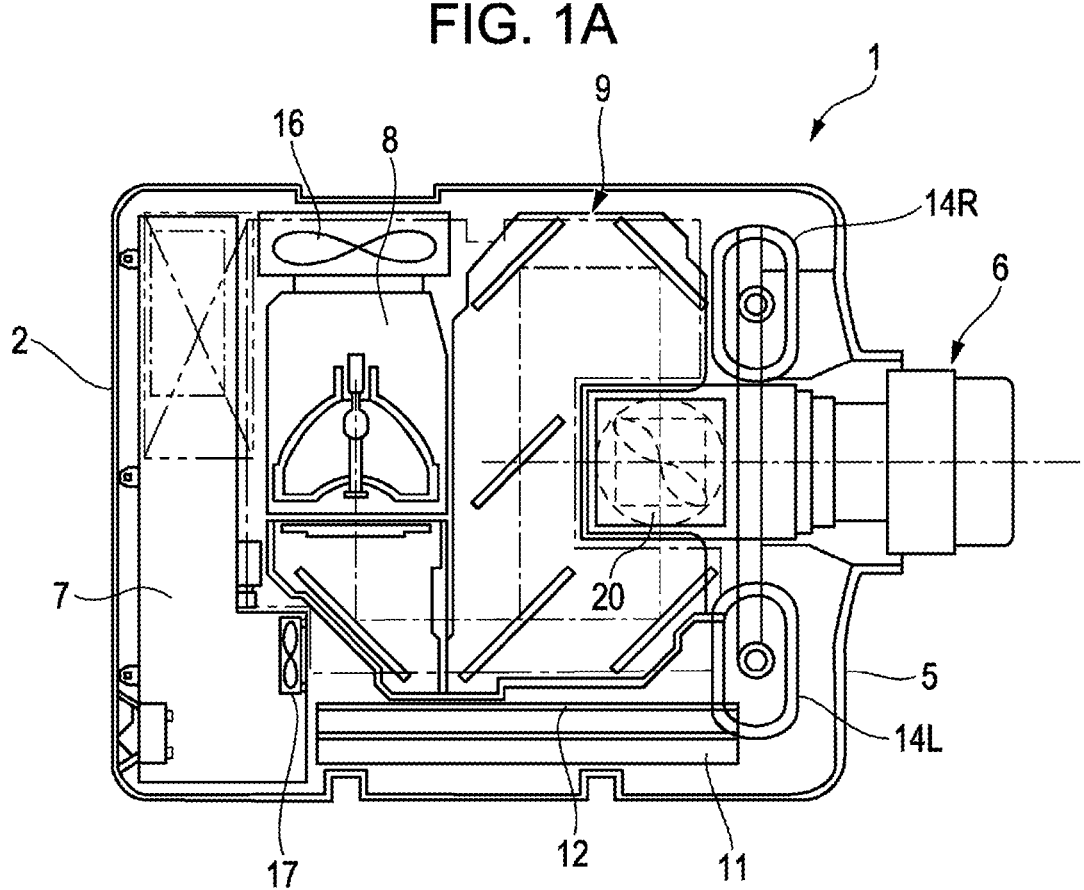
FIGS. 1A and 1B are explanatory diagrams illustrating a projection type display device as an example of an electronic apparatus to which the invention is applied.

Embodiments of the invention will be described with reference to the accompanying drawings. In addition, in the following descriptions, as an electronic apparatus to which the invention is applied, a projection type display device in which an electro-optic module including a transmission type electro-optic panel (a transmission type liquid crystal panel) is used as a light valve will be described. In addition, in the drawings referenced in the following descriptions, scales may differ for each layer or each member so that each layer or each member has a recognizable size on the drawings.

Configuration of Projection Type Display Device (Electronic Apparatus)

Figure 1B:
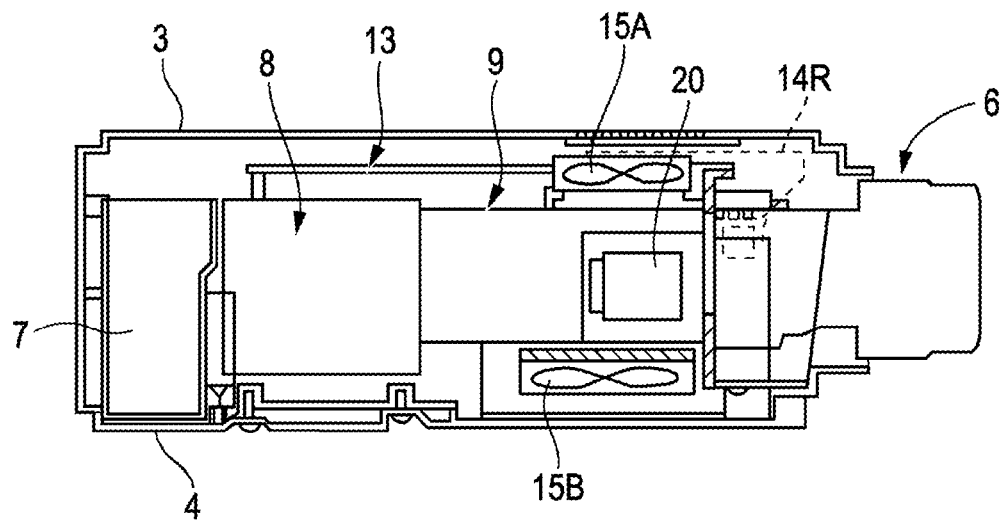
Figure 2:
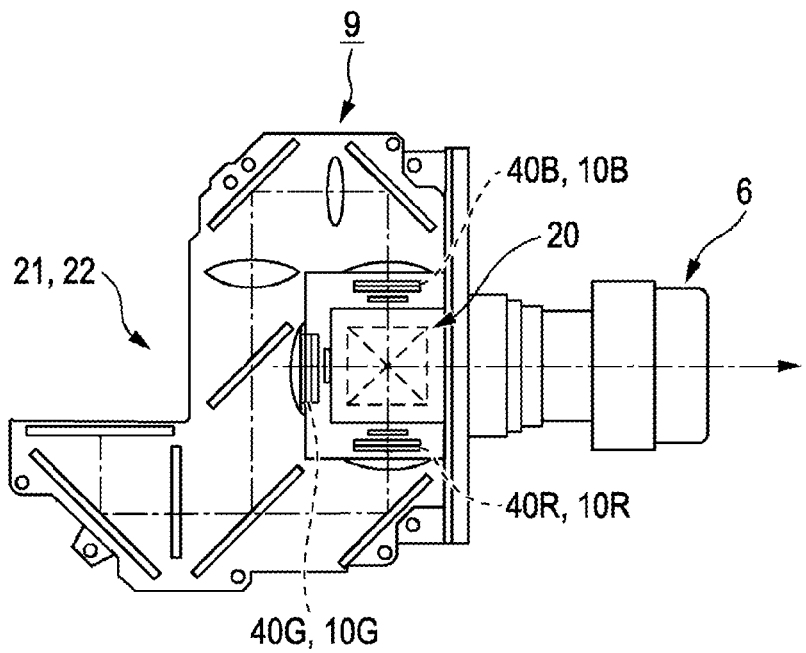
FIG. 2 is an explanatory diagram illustrating a configuration of an optical unit used in a projection type display device to which the invention is applied.

FIGS. 1A and 1B are explanatory diagrams illustrating a projection type display device as an example of an electronic apparatus to which the invention is applied, FIG. 1A is an explanatory diagrams illustrating a planar configuration of a main portion of the projection type display device, FIG. 1B is an explanatory diagram obtained when the main portion is viewed from a side, and FIG. 2 is an explanatory diagram illustrating a configuration of an optical unit used in a projection type display device to which the invention is applied.

In the projection type display device 1 shown in FIGS. 1A and 1B, a power supply unit 7 is arranged on a rear end side thereof inside an outer case 2, and a light source lamp unit 8 (a light source unit) and an optical unit 9 are arranged at positions of the power supply unit 7 adjacent to each other on a front side of the device. In addition, inside the outer case 2, a base end side of a projection lens unit 6 is positioned at the center of a front side of the optical unit 9. On a side of the optical unit 9, an interface substrate 11 on which an input/output interface circuit is mounted is arranged in forward and rearward direction of the device, and a video substrate 12 on which a video signal processing circuit is mounted is arranged in parallel to the interface substrate 11. On an upper side of the light source lamp unit 8 and the optical unit 9, a control substrate 13 for controlling driving of the device is arranged, and speakers 14R and 14L are respectively arranged at right and left corners of a front end side of the device.

On upper and lower sides of the optical unit 9, intake fans 15A and 15B for cooling the interior of the device are arranged. In addition, an exhaust fan 16 is arranged on a side surface of the device which is a rear surface side of the light source lamp unit 8. In addition, at positions facing ends of the interface substrate 11 and the video substrate 12, an auxiliary cooling fan 17 for sucking a cooling airflow from the intake fans 15A into the power supply unit 7 is arranged. Among these fans, the intake fan 15B acts as a cooling fan of a liquid crystal panel which will be described below.

In FIG. 2, each of optical elements constituting the optical unit 9 includes a prism unit 20 constituting a color light synthesizing unit, and is supported by an upper light guide 21 or a lower light guide 22 which is made of a metal such as Mg, Al. The upper light guide 21 and the lower light guide 22 are fixed to an upper case 3 and a lower case 4 by a fixing screw.

Detailed Configuration of Optical Unit 9

Figure 3:
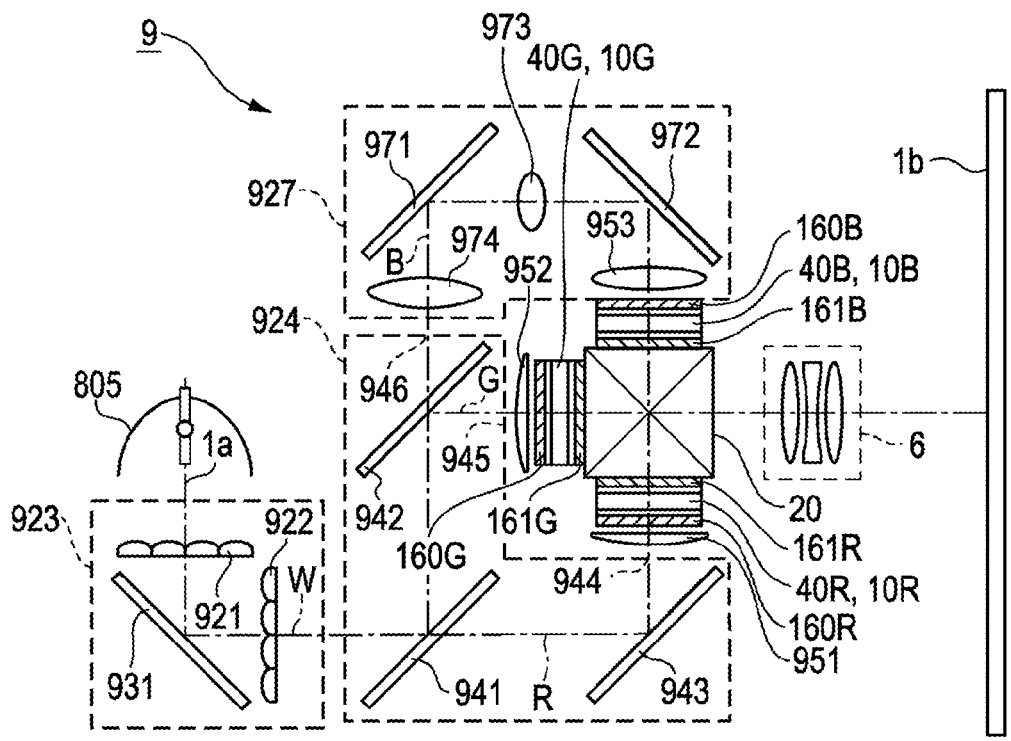
FIG. 3 is an explanatory diagram illustrating a detailed configuration of an optical unit used in a projection type display device to which the invention is applied.

FIG. 3 is an explanatory diagram illustrating a detailed configuration of an optical unit used in a projection type display device to which the invention is applied. As shown in FIG. 3, the optical unit 9 includes an illumination optical system 923 having a light source lamp 805 and integrator lenses 921 and 922 which are uniform illumination optical elements, and a color light separating optical system 924 that separates luminous flux W emitted from the illumination optical system 923 into red luminous flux R, green luminous flux G, and blue luminous flux B. In addition, the optical unit 9 includes three projection type electro-optical panels 40R, 40G, and 40B as an electro-optical panel (a light valve) for modulating each of color luminous fluxes, the prism unit 20 as a color light synthesizing optical system for synthesizing the modulated color luminous fluxes, and the projection lens unit 6 that magnifies and projects the synthesized luminous flux to a projection surface. In addition, the optical unit 9 includes a relay optical system 927 that guides to the electro-optical panel 40B corresponding to the blue luminous flux B among respective light luminous fluxes separated by the color light separating optical system 924.

The illumination optical system 923 includes a reflection mirror 931, and an optical axis 1a of light emitted from the light source lamp 805 is bent at a right angle in the forward direction of the device. Integrator lenses 921 and 922 are arranged in a state of being orthogonal to each other forward and backward, and interposed around the reflection mirror 931.

The color light separating optical system 924 includes a blue-green reflection dichroic mirror 941, a green reflection dichroic mirror 942, and a reflection mirror 943. First, in the blue-green light reflection dichroic mirror 941, among luminous fluxes W passing through the illumination optical system 923, the blue luminous flux B and the green luminous flux G which are included in the luminous fluxes X are reflected at a right angle, and the reflected fluxes are directed toward the green reflection dichroic mirror 942. The red luminous flux R passes through the blue-green reflection dichroic mirror 941, reflected at a right angle to the reflection mirror 943 behind the blue-green reflection dichroic mirror 941, and emitted from the to an emission unit 944 of the red luminous flux to the color light synthesizing optical system. Next, in the green reflection dichroic mirror 942, only the green luminous flux G of the blue and green luminous fluxes B and G which are reflected in the blue-green light reflection dichroic mirror 941 is reflected at a right angle, and emitted from an emission unit 945 of the green luminous flux to the color light synthesizing optical system. The blue luminous flux B passing through the green reflection dichroic mirror 942 is emitted from an emission unit 946 of the blue luminous flux to the relay optical system 927. In the present embodiment, distances from an emission unit of a luminous flux of the illumination optical system 923 to the emission units 944, 945 and 946 of the color luminous fluxes in the color light separating optical system 924 are set so as to be made almost equal.

On emission sides of the emission units 944 and 945 of the red luminous flux and the green luminous flux of the color light separating optical system 924, condensing lenses 951 and 952 are respectively arranged. Accordingly, the red luminous flux and the green luminous flux which are emitted from each emission unit are made incident on the condensing lenses 951 and 952 to be collimated.

The collimated red and green luminous fluxes R and G with their polarization directions aligned by polarization plates 160R and 160G are made incident on electro-optical panels 40R and 40G to be modulated, and image information corresponding to each color light is added. That is, the electro-optical panels 40R and 40G are switch-controlled by image signals corresponding to the image information by a driving unit, which is not shown, to thereby modulate each color light passing through the electro-optical panels 40R and 40G. As the driving unit, a well-known driving unit may be used as is.

Meanwhile, the blue luminous flux B with its polarization direction aligned by a polarization plate 160B through the relay optical system 927 is guided to the corresponding electro-optical panel 40B, and here, modulation is conducted to correspond to the image information in the same manner. The relay optical system 927 includes a condensing lens 974, an incident side reflection mirror 971, an emission side reflection mirror 972, an intermediate lens 973 arranged between these mirrors, and a condensing lens 953 arranged on a front side of the electro-optical panel 40B. Among distances of optical paths of respective light luminous fluxes, that is, distances from the light source lamp 805 to respective liquid crystal panels, an optical path of the blue luminous flux B is the longest, and therefore a loss of light quantity of the blue luminous flux B is maximized.

However, by interposing the relay optical system 927, it is possible to suppress a reduction in the loss of light quantity.

Each of the color luminous fluxes modulated by passing through each of the electro-optical panels 40R, 40G, and 40B is made incident on the polarization plates 161R, 161G, and 161B, and light that is transmitted through the polarization plates 161R, 161G, and 161B is made incident on the prism unit 20 (a cross-dichroic prism) to be synthesized. A color image which is synthesized here is magnified and projected to a surface 1b to be projected such as a screen or the like, which is positioned at a predetermined position, through a projection lens unit 6 including a projection lens system.

Configuration Of Electro-Optical Panel 40

Figure 4A:
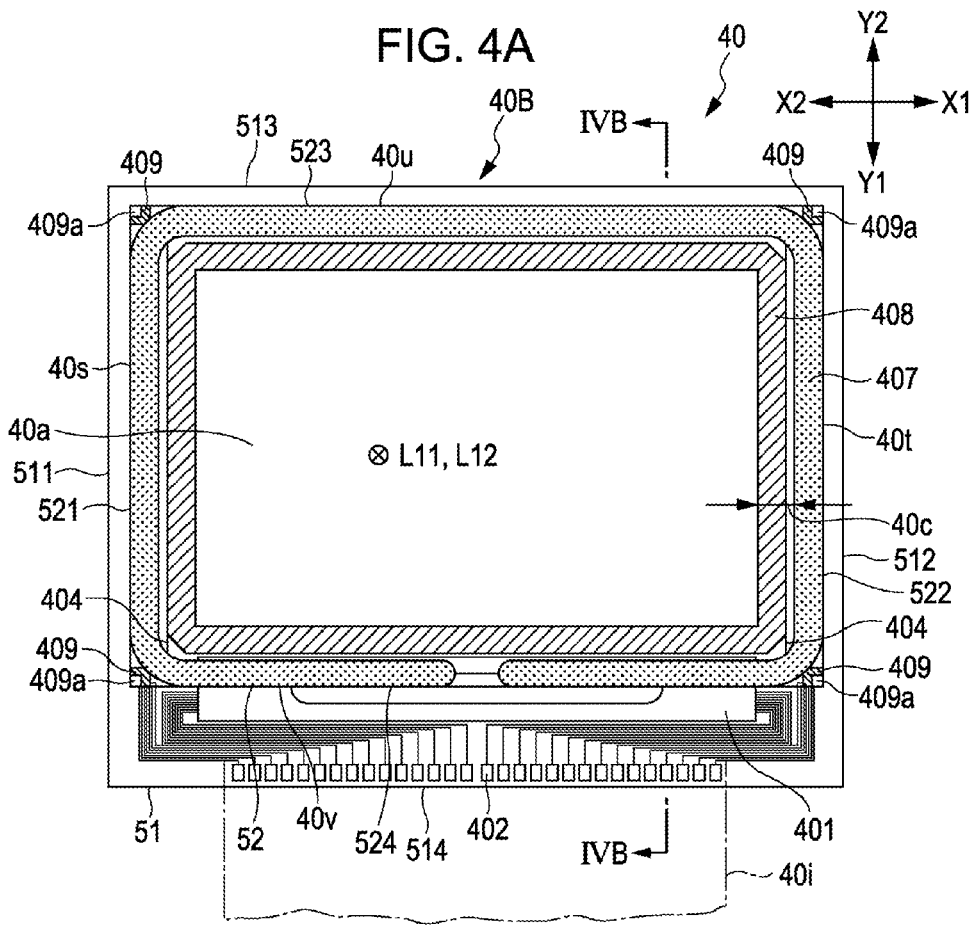
FIGS. 4A and 4B are explanatory diagrams illustrating an electro-optic panel used in an electro-optic module to which the invention is applied.
Figure 4B:
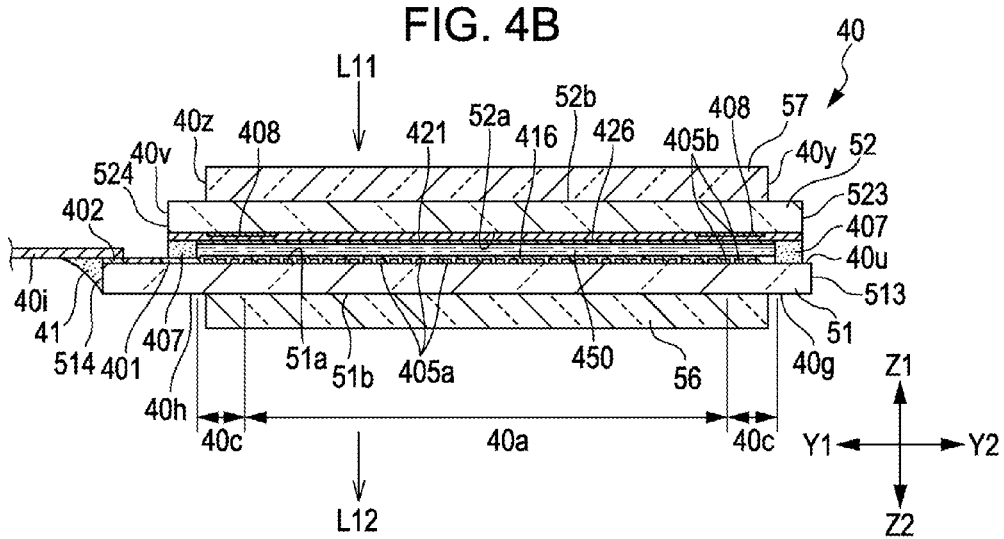

FIGS. 4A and 4B are explanatory diagrams illustrating an electro-optic panel 40 used in an electro-optic module to which the invention is applied. Here, FIG. 4A is a plan view obtained when the electro-optical panel 40 is viewed from a second substrate side together with each component, and FIG. 4B is a cross-sectional view taken from an IVB-IVB line of FIG. 4A.

In addition, in FIGS. 4A and 4B, and FIGS. 5 to 8B which will be described below, a propagation direction of light source light is indicated as an arrow L11, a propagation direction of display light obtained by modulating the light source light by the electro-optic panel 40 is indicated as an arrow L12, a flow of cooling air supplied to the electro-optic panel 40 by the intake fan 15B shown in FIGS. 1A and 1B, or the like is indicated by an arrow A. In addition, in the following descriptions, one of directions to mutually cross in the in-plane direction of the electro-optic panel 40 and the electro-optic module is indicated as an X axis direction, the other thereof is indicated as a Y axis direction, and a direction which crosses in the X axis direction and the Y axis direction is indicated as a Z axis direction.

In addition, in the following descriptions, one side (a side on which a flexible wiring substrate 40i is mounted) of the X axis direction is indicated as a side X1, the other side of the X axis direction is indicated as a side X2, one side of the Y axis direction is indicated as a side Y1, the other side of the Y axis direction is indicated as a side Y2, one side (a side on which a light source light is made incident) of the Z axis direction is indicated as a side Z1, and the other side (a side from which a display light is emitted) of the Z axis direction is indicated as a side Z2.

In the projection type display device 1 described with reference to FIGS. 1A to 3, when the electro-optic panels 40R, 40G, and 40B are mounted on the optical unit 9, each of the electro-optic panels 40R, 40G, and 40B is mounted as electro-optic modules 10R, 10G, and 10B which will be described below. Here, the electro-optic panels 40R, 40G, and 40B have the same configuration, and the electro-optic modules 10R, 10G, and 10B including the electro-optic panels 40R, 40G, and 40B have the same configuration for red (R), green (G), and blue (B). Accordingly, in the following descriptions, the electro-optic panels 40R, 40G, and 40B, and the electro-optic modules 10R, 10G, and 10B will be described without applying (R), (G), and (B) indicating corresponding colors thereto.

As shown in FIGS. 4A and 4B, in the electro-optic panel 40, a first light-transmissive substrate 51 (an element substrate) and a second light-transmissive substrate 52 (a counter substrate) are adhered to each other by a seal material 407 through a predetermined gap therebetween. As the first substrate 51 and the second substrate 52, quartz glass, heat-resistant glass, or the like may be used, and in the present embodiment, quartz glass is used as the first substrate 51 and the second substrate 52. In the present embodiment, the electro-optic panel 40 is a liquid crystal panel, and a liquid crystal layer as an electro-optic material layer 450 is held within a region surrounded by the seal material 407 between the first substrate 51 and the second substrate 52. The seal material 407 is provided in a frame shape along an outer edge of the second substrate 52. The seal material 407 is a photosetting adhesive, a thermosetting adhesive, or a photosetting and thermosetting adhesive, and a gap material such as glass fiber, glass beads, or the like which is used for obtaining a specific value as a distance between both the substrates is blended into the seal material 407.

In the present embodiment, the first substrate 51 is a rectangle, and includes end portions 511, 512, 513, and 514 composed of four sides thereof. The second substrate 52 is a rectangle such as in the first substrate 51, and includes end portions 521, 522, 523, and 524 composed of four sides thereof. At a substantially center of the electro-optic panel 40, an image display region 40a that emits modulated light is provided as a rectangular region. To correspond to the shape of the image display region 40a, the seal material 407 is provided in a substantially rectangular shape, and a rectangular frame-shaped peripheral region 40c is provided between an inner peripheral edge of the seal material 407 and an outer peripheral edge of the image display region 40a.

In the present embodiment, a size of the first substrate 51 is larger than that of the second substrate 52, and the four end portions 511, 512, 513, and 514 of the first substrate 51 project outward from the end portions 521, 522, 523, and 524 of the second substrate 52. For this reason, in a periphery of the second substrate 52, stepped portions 40s, 40t, 40u, and 40v are formed by the first substrate 51 and the end portions 521, 522, 523, and 524 of the second substrate 52, and in the stepped portions 40s, 40t, 40u, and 40v, the first substrate 51 is exposed from the second substrate 52. In addition, among the four end portions 511, 512, 513, and 514, the end portion 514 positioned on one side Y1 of the Y axis direction projects to a greater extent from the end portion 524 of the second substrate 52 rather than from the other end portions 511, 512, and 513, and a data line driving circuit 401 and a plurality of terminals 402 are formed along the end portion 514 on the first substrate 51. In addition, on the first substrate 51, a scan line driving circuit 404 is formed along the end portions 511 and 512. The flexible wiring substrate 40i is connected to the terminal 402, and a variety of potentials or signals are input to the first substrate 51 through the flexible wiring substrate 40i.

In addition, the first substrate 51 is coated with a reinforcement adhesive 41 so as to extend over the end portion 514 and the flexible wiring substrate 40i.

On a first surface 51a facing the second substrate 52 among the first surface 51a and a second surface 51b of the first substrate 51, a pixel including a light-transmissive pixel electrode 405a and a pixel transistor (a switching element/not shown) corresponding to the light-transmissive pixel electrode 405a is formed in the image display region 40a in a matrix shape, and an alignment layer 416 is formed on an upper layer side of the pixel electrode 405a. In addition, on the first surface 51a of the first substrate 51, a dummy pixel electrode 405b is formed simultaneously with the pixel electrode 405a in the peripheral region 40c. With regard to the dummy pixel electrode 405b, a configuration of being electrically connected with dummy pixel transistors, a configuration of being directly and electrically connected with a wiring in such a manner that the dummy pixel transistors are not provided, or a configuration of being in a floating state in which a potential is not applied may be adopted.

On a first surface 52a facing the first substrate 51 among the first surface 52a and a second surface 52b of the second substrate 52, a light-transmissive common electrode is 421 is formed, and an alignment layer 426 is formed on an upper layer of the common electrode 421. The common electrode 421 is formed on almost the entire surface of the second substrate 52, or formed so as to extend over a plurality of pixels as a multi-strip shaped electrode, and in the present embodiment, the common electrode 421 is formed on almost the entire surface of the second substrate 52. In addition, on the first substrate 52a of the second substrate 52, a light-shielding layer 408 is formed on a lower layer side of the common electrode 421. In the present embodiment, the light-shielding layer 408 is formed in a frame shape that extends along an outer peripheral edge of the image display region 40a, and the image display region 40a is defined by an inner edge of the light-shielding layer 408. An outer peripheral edge of the light-shielding layer 408 is positioned at a position with a gap between the outer peripheral edge of the light-shielding layer 408 and the inner peripheral edge of the seal material 407, so that the light-shielding layer 408 and the seal material 407 are not covered. In addition, on the second substrate 52, a light-shielding layer that is formed simultaneously with the light-shielding layer 408 may be formed as a black matrix or a black stripe in a region overlapped with a region to be sandwiched by the pixel electrodes 405a adjacent to each other, or the like.

On the first substrate 51, an inter-substrate conduction electrode 409 for establishing electrical conduction between the first substrate 51 and the second substrate 52 is formed in a region overlapped with a corner portion of the second substrate 52 outside the seal material 407. An inter-substrate conduction material 409a containing conductive particles is arranged between the inter-substrate conduction electrode 409 and the second substrate 52, and the common electrode 421 of the second substrate 52 is electrically connected to the first substrate 51 side through the inter-substrate conduction material 409a and the inter-substrate conduction electrode 409. For this reason, a common potential is applied from the first substrate 51 side to the common electrode 421. The seal material 407 is provided along an outer peripheral edge of the second substrate 52 while having substantially the same width. However, in the region overlapped with the corner portion of the second substrate 52, the seal material 407 is provided so as to pass through an inner side of the region by avoiding the inter-substrate conduction electrode 409.

In the electro-optic panel 40 according to the present embodiment, since the pixel electrode 405a and the common electrode 421 are formed by a light-transmissive conductive film such as an ITO film, the electro-optical panel 40 is a transmission type liquid crystal panel. In a case of the transmission type liquid crystal panel (the electro-optic panel 40), light that is made incident from one substrate of the first and second substrates 51 and 52 is modulated while being transmitted through the other substrate to be emitted. In the present embodiment, light (indicated by an arrow L11) that is made incident from the second substrate 52 is transmitted through the first substrate 51, and emitted as a modulated light (indicated by an arrow L12). For this reason, the second substrate 52 is arranged on one side Z1 of the Z axis direction, and the first substrate 51 is arranged on the other side Z2 of the Z axis. In addition, when the common electrode 421 is formed by the light-transmissive conductive film, and the pixel electrode 405a is formed by a reflective conductive film, it is possible to configure a reflection type liquid crystal panel. In a case of the reflection type liquid crystal panel, light that is made incident from the second substrate 52 side is modulated while being reflected on the first substrate 51 side to be emitted. The electro-optic panel 40 according to the present embodiment is used as a light valve in the projection type display device (a liquid crystal projector), and therefore a color filter is not formed. However, when the electro-optic 40 is used as a direct viewing type color display device of an electronic apparatus such as a mobile computer, a portable phone, or the like, the color filter is formed on the second substrate 52.

Entire Configuration of Electro-Optic Module 10

Figure 5:
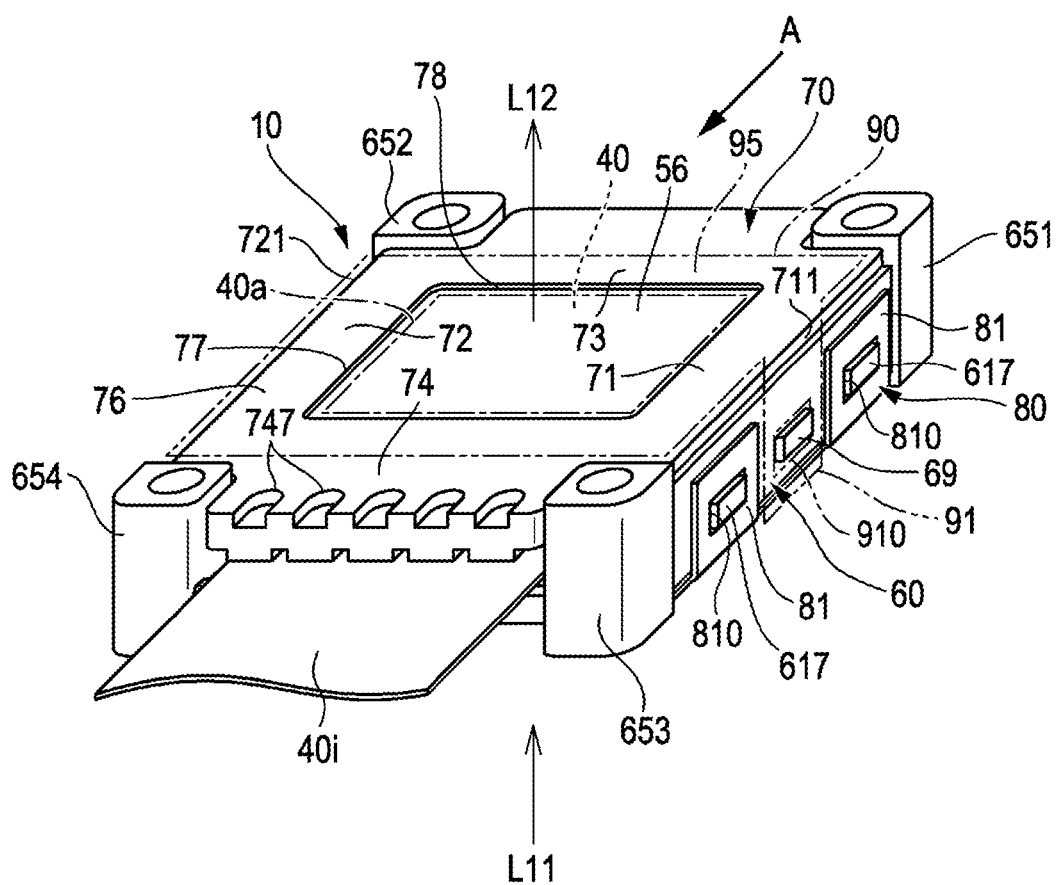
FIG. 5 is a perspective view obtained when an electro-optic module used in a projection type display device to which the invention is applied is viewed from a light-emitting side.

FIG. 5 is a perspective view obtained when an electro-optic module used in a projection type display device 1 to which the invention is applied is viewed from a light-emitting side, and FIGS. 6A, 6B, 6C, and 6D are explanatory diagrams illustrating an electro-optic module used in the projection type display device 1 to which the invention is applied. Here, FIGS. 6A, 6B, 6C, and 6D are respectively a plan view when the electro-optic module is viewed from a light-emitting side, a cross-sectional view taken from an VIB-VIB line, a cross-sectional view taken from a VIC-VIC line, and a bottom view when the electro-optic module is viewed from a light-incident side. In addition, FIG. 7 is an exploded perspective view obtained when a state in which an electro-optic module used in the projection type display device 1 to which the invention is applied is exploded is viewed from a light-emitting side.

FIGS. 8A and 8B are explanatory diagrams illustrating an enlarged cross-sectional configuration of an electro-optic module used in a projection type display device 1 to which the invention is applied, in which FIG. 8A is an explanatory diagram illustrating an enlarged VIB-VIB cross-section and FIG. 8B is an enlarged VIC-VIC cross-section.

When the electro-optic panel 40 which has been described with reference to FIGS. 4A and 4B is mounted on the optical unit 9 of the projection type display device 1 which is described with reference to FIGS. 1A to 3, each of the electro-optic panels 40 is mounted as the electro-optic module 10, as described below with reference to FIGS. 5 to 8B.

Here, the electro-optic panels 40R, 40G, and 40B have the same configuration, and the electro-optic modules 10 including the electro-optic panels 40R, 40G, and 40B have the same configuration for red (R), green (G), and blue (B). Accordingly, in the following descriptions, the electro-optic panels 40 and the electro-optic modules 10 will be described without applying (R), (G), and (B) indicating corresponding colors thereto.

As shown in FIGS. 4A to 8B, when the electro-optic panel 40 is mounted on the optical unit 9 of the projection type display device 1, the electro-optic module 10 in which the electro-optic panel 40 is held by a frame 60 is used for the purpose of reinforcement. In addition, in the electro-optic module 10 according to the present embodiment, a heat radiation member 70 which will be described below or a parting member 80 of an incident side are used in addition to the electro-optic panel 40 and the frame 60. Hereinafter, a detailed configuration of the electro-optic module 10 will be described mainly with reference to FIGS. 8A and 8B.

Configuration of First Light-Transmissive Plate 56 and Second Light-Transmissive Plate 57

As shown in FIGS. 8A and 8B, in the present embodiment, when configuring the electro-optic module 10 using the electro-optic panel 40, on the second surface 51b (an external surface/an opposite surface of the first substrate 51 to the second substrate 52) of the first substrate 51, a first light-transmissive plate 56 is adhered by an adhesive or the like, and on the second surface 52b (an external surface/an opposite surface of the second substrate 52 to the first substrate 51) of the second substrate 52, a second light-transmissive plate 57 is adhered by an adhesive or the like. Each of the first light-transmissive plate 56 and the second light-transmissive plate 57 is configured as a dust-proof glass, and therefore dust or the like is prevented from being adhered to the external surface (the second surface 51b) of the first substrate 51 and the external surface (the second surface 52b) of the second substrate 52. For this reason, even though dust is adhered to the electro-optic panel 40, dust is separated from the electro-optic material layer 450. Accordingly, it is possible to suppress dust from being reflected as a reflection on an image projected from the projection type display device 1 which has been described with reference to FIGS. 1A and 1B and the like. As the first light-transmissive plate 56 and the second light-transmissive plate 57, quartz glass, heat-resistant glass, or the like may be used, and in the present embodiment, quartz glass is used as the first light-transmissive plate 56 and the second light-transmissive plate 57 in the same manner as that of the first substrate 51 and the second substrate 52, and a thickness of the quartz glass is 1.1 mm to 1.2 mm.

Here, the first light-transmissive plate 56 is provided so as to be overlapped with at least the image display region 40a of the electro-optic panel 40 in a state in which a part of the second surface 51b of the first substrate 51 is exposed. More specifically, the first light-transmissive plate 56 is a rectangle having a smaller size than that of the first substrate 51, so that each of end portions 561, 562, 563, and 564 of the first light-transmissive plate 56 is positioned inwardly from the end portions 511, 512, 513, and 514 of the first substrate 51 over the whole periphery of the first light-transmissive plate 56, and positioned between the end portions 511, 512, 513, and 514 of the first substrate 51 and an end portion of the image display region 40a. For this reason, in a periphery of the first light-transmissive plate 56, stepped portions 40e, 40f, 40g, and 40h are formed by the end portions 561, 562, 563, and 564 of the first light-transmissive plate 56 and the second surface 51b of the first substrate 51.

In addition, the second light-transmissive plate 57 is provided so as to be overlapped with at least the image display region 40a of the electro-optic panel 40 in a state in which a part of the second surface 52b of the second substrate 52 is exposed. More specifically, the second light-transmissive plate 57 is a rectangle having approximately the same size as that of the first light-transmissive plate 56, and smaller than a size of the second substrate 52. For this reason, each of end portions 571, 572, 573, and 574 of the second light-transmissive plate 57 is positioned inwardly from the end portions 521, 522, 523, and 524 of the second substrate 52 over the whole periphery of the second light-transmissive plate 57, and positioned between the end portions 521, 522, 523, and 524 of the second substrate 52 and the image display region 40a. Accordingly, in a periphery of the second light-transmissive plate 57, stepped portions 40w, 40x, 40y, and 40z are formed by the end portions 571, 572, 573, and 574 of the second light-transmissive plate 57 and the second surface 52b of the second substrate 52.

Configuration of Frame 60

In the present embodiment, the frame 60 is a rectangular frame-shaped resin or metallic member including a rectangular opening 68 (see, FIG. 7) at a center thereof, and includes four frame portions 61, 62, 63, and 64 which surround around the electro-optic panel 40. In the four frame portions 61, 62, 63, and 64, a connection portion (a corner portion) of the frame portions adjacent to each other is prismatic connection portions 651, 652, 653, and 654. In the present embodiment, the frame 60 is a metallic member.

In the frame 60, an inner surface of each of the frame portions 61, 62, 63, and 64 has a multistage-structure that corresponds to a shape of an end portion of a state in which the first light-transmissive plate 56 and the second light-transmissive plate 57 are adhered to the electro-optic panel 40. More specifically, as shown in FIG. 8B, on the inner surface of the frame portion 61 positioned on the other side X2 of the X axis direction, three stepped portions 61a, 61b, and 61c are formed along the Z axis in which the second light-transmissive plate 57, the second substrate 52, the first substrate 51, and the first light-transmissive plate 56 are arranged. Here, the stepped portion 40w of the electro-optic panel 40 side faces the stepped portion 61a of the frame portion 61, the end portion 40s of the electro-optic panel 40 side faces the stepped portion 61b of the frame portion 61, and the stepped portion 40e of the electro-optic panel 40 side faces the stepped portion 61c of the frame portion 61. For this reason, the end portion 571 of the second light-transmissive plate 57 is spaced apart from the inner surface of the frame portion 61 through a gap, the end portion 521 of the second substrate 52 is spaced apart from the inner surface of the frame portion 61 through a significantly narrow gap, and the end portion 511 of the first substrate 51 is spaced apart from the inner surface of the frame portion 61 through a gap. In addition, the end portion 561 of the first light-transmissive plate 56 is spaced apart from the inner surface of the frame portion 61 through a sufficiently wide space. These spaced-apart dimensions are in the following magnitude relation such as; a spaced-apart dimension between the end portion 521 of the second substrate 52 and the inner surface of the frame portion 61<a spaced-apart dimension between the end portion 571 of the second light-transmissive plate 57 and the inner surface of the frame portion 61<a spaced-apart dimension between the end portion 511 of the first substrate 51 and the inner surface of the frame portion 61<<a spaced-apart dimension between the end portion 561 of the first light-transmissive plate 56 and the inner surface of the frame portion 61.

On an inner surface of the frame portion 62 positioned on one side X1 of the X axis direction, in the same manner as that of the inner surface of the frame portion 61, three stepped portions 62a, 62b, 62c are formed along the Z axis direction in which the second light-transmissive plate 57, the second substrate 52, the first substrate 51, and the first light-transmissive plate 56 are arranged. Here, the end portion 40x of the electro-optic panel 40 side faces the stepped portion 62a of the frame portion 62, the end portion 40t of the electro-optic panel 40 side faces the stepped portion 62b of the frame portion 62, and the stepped portion 40f of the electro-optic panel 40 side faces the stepped portion 62c of the frame portion 62. For this reason, the end portion 572 of the second light-transmissive plate 57 is spaced apart from the inner surface of the frame portion 62 through a gap, the end portion 522 of the second substrate 52 is spaced apart from the inner surface of the frame portion 62 through a significantly narrow gap, and the end portion 512 of the first substrate 51 is spaced apart from the inner surface of the frame portion 62 through a gap. In addition, the end portion 562 of the first light-transmissive plate 56 is spaced apart from the inner surface of the frame portion 62 through a sufficiently wide space. These spaced-apart dimensions are in the following magnitude relation such as; a spaced-apart dimension between the end portion 522 of the second substrate 52 and the inner surface of the frame portion 62<a spaced-apart dimension between the end portion 572 of the second light-transmissive plate 57 and the inner surface of the frame portion 62<a spaced-apart dimension between the end portion 512 of the first substrate 51 and the inner surface of the frame portion 62<<a spaced-apart dimension between the end portion 562 of the first light-transmissive plate 56 and the inner surface of the frame portion 62.

As shown in FIG. 8A, on an inner surface of the frame portion 63 positioned on the other side Y2 of the Y axis direction, only two stepped portions 63a and 63b are formed along the Z axis direction in which the second light-transmissive plate 57, the second substrate 52, the first substrate 51, and the first light-transmissive plate 56 are arranged, unlike the inner surfaces of the frame portions 61 and 62. Here, the stepped portion 40y of the electro-optic panel 40 side faces the stepped portion 63a of the frame portion 63, and the end portion 40u of the electro-optic panel 40 side faces the stepped portion 63b of the frame portion 63. For this reason, the end portion 573 of the second light-transmissive plate 57 is spaced apart from the inner surface of the frame portion 63 through a gap, the end portion 523 of the second substrate 52 is spaced apart from the inner surface of the frame portion 63 through a significantly narrow gap, and the end portion 513 of the first substrate 51 is spaced apart from the inner surface of the frame portion 63 through a gap. These spaced-apart dimensions are in the following magnitude relation such as: a spaced-apart dimension between the end portion 523 of the second substrate 52 and the inner surface of the frame portion 63<a spaced-apart dimension between the end portion 573 of the second light-transmissive plate 57 and the inner surface of the frame portion 63<a spaced-apart dimension between the end portion 513 of the first substrate 51 and the inner surface of the frame portion 63. In addition, the frame portion 63 has a smaller dimension of the Y axis direction compared to the frame portions 61 and 62, and therefore the frame portion 63 does not reach to an external side of the end portion 563 of the first light-transmissive plate 56.

On an inner surface of the frame portion 64 positioned on one side Y1 of the Y axis direction, only one stepped portion 64a is formed unlike the inner surfaces of the frame portions 61, 62, and 63. In the frame portion 64, an external side of the stepped portion 64a is used as a plate-shaped portion 64f that spreads in the in-plane direction of the electro-optic panel 40, and a portion between the stepped portion 64a and the plate-shaped portion 64f is used as a tapered surface 64g. For this reason, the flexible wiring substrate 40i may be projected outwardly from the frame 60 so as to extend along the in-plane direction of the electro-optic panel 40. On a surface of the plate-shaped portion 64f which is positioned on the flexible wiring substrate 40i side, two projections 64h are formed. For this reason, displacement toward the plate-shaped portion 64f of the flexible wiring substrate 40i is restricted by the projection 64h. In addition, a stepped portion 40z of the electro-optic panel 40 side faces the stepped portion 64a of the frame portion 64. For this reason, the end portion 574 of the second light-transmissive plate 57 is spaced apart from the inner surface of the frame portion 64 through a gap.

When housing the electro-optic panel 40 on the inner side of the frame 60 having the above-described configuration, the electro-optic panel 40 is provided on the inner side of the frame 60 in such a manner that the first light-transmissive plate 56 and the second light-transmissive plate 57 are adhered to the electro-optic panel 40, and then preceded by the second light-transmissive plate 57 side from a side (the other side Z2 of the Z axis direction) of the frame 60 from which display light is emitted. In this instance, the end portions 521, 522, 523, and 524 of the second substrate 52 project outward from the second light-transmissive plate 57. Therefore, in the present embodiment, in the frame portion 61, a corner portion positioned between the stepped portions 61a and 61b is used as a tapered surface 61g that is oriented obliquely toward the other side Z2 of the Z axis direction, so that the end portion 521 of the second substrate 52 is guided inward on the tapered surface 61g. In addition, in the frame portion 62, in the same manner as that in the frame portion 61, a corner portion positioned between stepped portions 62a and 62b is used as a tapered surface 62g that is oriented obliquely toward the other side Z2 of the Z axis direction, so that the end portion 522 of the second substrate 52 is guided inward on the tapered surface 62g. In addition, in the frame portion 63, in the same manner as that in the frame portion 61, a corner portion positioned between the stepped portions 63a and 63b is used as a tapered portion 63g that is oriented obliquely toward the other side Z2 of the Z axis direction, so that the end portion 523 of the second substrate 52 is guided inward on the tapered surface 63g. In addition, even in the frame portion 64, a corner portion positioned between the stepped portion 64a and the plate-shaped portion 64f is used as a tapered surface 64g that is oriented obliquely toward the other side Z2 of the Z axis direction, so that the end portion 524 of the second substrate 52 is guided inward on the tapered surface 64g.

Configuration of Parting Member 80 of Incident Side

On a light incident side (one side Z1 of the Z axis direction) of the frame 60, plate-shaped parting members 80 which include a metal plate or a resin plate are disposed in a superimposed fashion. In the present embodiment, the parting member 80 is made of a metal material. The parting member 80 includes a rectangular end plate portion 87 which is superimposed on the light incident side with respect to the frame 60, and an opening 88 which is superimposed on the opening 68 of the frame 60 is formed in the end plate portion 87. The opening 88 is smaller than the opening 68 of the frame 60, and the end plate portion 87 is projected inwardly from the opening 68 over the whole periphery of the opening 68. For this reason, the end plate portion 87 of the parting member 80 acts as a parting member that restricts a range in which light is made incident on the electro-optic panel 40.

The parting member 80 includes side plate portions 81, 82, 83, and 84 which extend from an outer edge of the end plate portion 87. Among the side plate portions 81, 82, 83, and 84, the side plate portion 83 positioned on the other side Y2 of the Y axis direction extends so as to be superimposed on a surface of one side Z1 of the Z axis direction of the frame portion 63, and a distal end side is bent obliquely along a shape of the frame portion 63. In addition, the side plate portion 84 positioned on one side Y1 of the Y axis direction extends so as to be superimposed on a surface of one side Z1 of the Z axis direction of the frame portion 64, and a distal end side is bent obliquely along a shape of the frame portion 64.

The side plate portion 81 positioned on the other side X2 of the X axis direction is bent substantially at a right angle towards the other side Z2 of the Z axis direction from an end portion of the end plate portion 87 so as to be overlapped on an outer surface of the frame portion 61. In the present embodiment, the side plate portion 81 is provided at two places which are spaced apart from each other in the Y axis direction, and an engagement hole 810 is formed in each of the two side plate portions 81. Meanwhile, on the outer surface of the frame portion 61 of the frame 60, a projection 617 fitted to each of the two engagement holes 810 is formed. In addition, the side plate portion 82 positioned on one side X1 of the X axis direction is bent substantially at a right angle towards the other side Z2 of the Z axis direction from the end portion of the end plate portion 87 so as to be overlapped on an outer surface of the frame portion 62. In the present embodiment, the side plate portion 82 is provided at two places which are spaced apart from each other in the Y axis direction, and an engagement hole 820 is formed in each of the two side plate portions 82. Meanwhile, on the outer surface of the frame portion 62 of the frame 60, a projection 627 fitted to each of the two engagement holes 820 is formed. Accordingly, the parting member 80 is connected to the frame 60 to be integrated with the frame 60 in such a manner that the side plate portions 81 and 82 provided so as to interpose the frame 60 from both sides are engaged with the projections 617 and 627 of the frame 60. As a result, on an inner side of the frame 60, a panel housing unit 66 that uses the end plate portion 87 of the parting member 80 as a bottom portion is formed, and the electro-optic panel 40 to which the first and second light-transmissive plates 56 and 57 are adhered is housed in the panel housing unit 66.

In addition, on an outer surface of the frame portions 61 and 62 of the frame 60, a projection 69 is formed in a position interposed by the projections 617 and 627, and a temporary fastener 90, which will be described below with reference to FIG. 5, is engaged with the projection 69 when assembling the electro-optic module 10.

In addition, in the present embodiment, the frame-shaped end plate portion 87 of the parting member 80 is used as a partition of the incident side, but a light-shielding layer is provided in a region overlapped with the end plate portion 87 in the second light-transmissive plate 57, so that the partition of the incident side may be performed by the light-shielding layer and the parting member 80.

Configuration of Heat Radiation Member 70

As described above, in the present embodiment, the first light-transmissive plate 56 is formed in a rectangular shape having a smaller size than that of the first substrate 51, and the second surface 51b of the first substrate 51 is exposed from the first light-transmissive plate 56 along the end portions 511, 512, 513, and 514 over the whole periphery of the second surface 51b. Therefore, in the present embodiment, on the second surface 51b of the first substrate 51, the heat radiation member 70 is provided in at least a part of portions which are exposed from the first light-transmissive plate 56 so as to be overlapped on the other side Z2 of the Z axis direction, and the heat radiation member 70 is made of a material having higher thermal conductivity than that of the first light-transmissive plate 56. More specifically, the heat radiation member 70 is made of a metal material such as aluminum, copper, and in the present embodiment, an aluminum forged product is used as the heat radiation member 70. In addition, a blackening treatment is performed on the whole surface of the heat radiation member 70 by coating or the like. The heat radiation member 70 includes a rectangular frame portion 76 which is superimposed on an outer periphery region of the second surface 51b over the whole periphery of the first substrate 51, and the rectangular frame portion 76 includes four frame portions 71, 72, 73, and 74.

In addition, the heat radiation member 70 includes an inner peripheral side thin plate portion 77 that is projected inwardly from an inner edge of the rectangular frame portion 76, and the inner peripheral side thin plate portion 77 is superimposed on an opposite surface of the first light-transmissive plate 56 side on which the electro-optic panel 40 is positioned. Here, in the inner peripheral side thin plate portion 77, an opening 78 is formed in a region overlapped with the image display region 40a of the electro-optic panel 40, and the inner peripheral side thin plate portion 77 acts as a parting portion of the emission side. In this manner, in the present embodiment, the parting portion (the inner peripheral side thin plate portion 77) is integrally formed in the heat radiation member 70.

In addition, in the heat radiation member 70, an outer peripheral side thin plate portion 711 is formed toward the other side X2 of the X axis direction from the frame portion 71 of the rectangular frame portion 76, and an outer peripheral side thin plate portion 721 is formed toward one direction X1 of the X axis direction from the frame portion 72 of the rectangular frame portion 76. Here, a dimension of the X axis direction of the frame portion 71 is smaller than a spaced-apart distance in the X axis direction between the frame portion 71 of the first light-transmissive plate 56 and the frame portion 61 of the frame 60, and a dimension of the X axis direction of the frame portion 72 is smaller than a spaced-apart distance in the X axis direction between the frame portion 72 of the first light-transmissive plate 56 and the frame portion 62 of the frame 60.

A dimension of the Y axis direction of each of the frame portions 73 and 74 is larger than a dimension of the X axis direction of each of the frame portions 71 and 72. Unlike the frame portions 71 and 72, the frame portions 73 and 74 is formed with an approximately constant thickness (a dimension of the Z axis direction) without the outer peripheral side thin plate portion formed therein. Here, a dimension of the Z axis direction of the frame portion 63 of the frame 60 is small. For this reason, the frame portion 63 of the frame 60 does not face the first light-transmissive plate 56 on the other side Y2 of the Y axis direction, and the frame portion 64 of the frame 60 does not face the first light-transmissive plate 56 on one side Y1 of the Y axis direction.

Accordingly, when the electro-optic panel 40 to which the first and second light-transmissive plates 56 and 57 are adhered is disposed in the panel housing unit 66 formed in the inner side of the frame 60, and then the heat radiation member 70 is disposed in the other side Z2 of the Z axis direction with respect to the electro-optic panel 40, the frame portion 71 enters between the end portion 561 of the first light-transmissive plate 56 and a plate-shaped portion 619 provided in the frame portion 61 of the frame 60 to thereby be superimposed on the second surface 51*b* side of the first substrate 51 on which the end portion 511 is positioned while contacting the second surface 51*b* side. In addition, the frame 72 enters between the end portion 562 of the first light-transmissive plate 56 and a plate-shaped portion 629 provided in the frame portion 62 of the frame 60 to thereby be superimposed on the second surface 51*b* side of the first substrate 51 on which the end portion 512 is positioned while contacting the second surface 51*b* side. In addition, the frame 73 is superimposed on the frame portion 63 of the frame 60 to thereby be superimposed on the second surface 51*b* side of the first substrate 51 on which the end portion 513 is positioned while contacting the second surface 51*b* side.

In addition, the frame portion 74 is superimposed on the frame portion 64 of the frame 60 to thereby be superimposed on the second surface 51*b* side of the first substrate 51 on which the end portion 514 is positioned while contacting the second surface 51*b* side. Accordingly, it is possible to release heat generated in the electro-optic panel 40 through the first substrate 51 and the frame portions 71, 72, 73, and 74 of the heat radiation member 70.

In addition, when the heat radiation member 70 is disposed on the other side Z2 of the Z axis direction with respect to the electro-optic panel 40, the inner peripheral side thin plate portion 77 of the heat radiation member 70 is overlapped on a surface of the other side Z2 of the Z axis direction over the whole periphery of the first light-transmissive plate 56 to thereby act as a partition. Here, a thickness of the inner peripheral side thin plate portion 77 is significantly small compared to a thickness (a dimension of the Z axis direction) of the rectangular frame portion 76 or a thickness (a dimension of the Z axis direction) of the outer peripheral side thin plate portions 711 and 721. For example, the thickness of the inner peripheral side thin plate portion 77 is 0.2 mm or less. For this reason, as shown by an arrow A, when a flow of cooling air is generated along a surface of the other side Z2 of the Z axis direction of the electro-optic panel 40 by the intake fan 15B shown in FIGS. 1A and 1B or the like, the cooling air enters the opening 78 (the opening 78 of the inner peripheral side thin plate portion 77 (partition)) of the heat radiation member 70 in an uninterrupted manner, and flows from the other side Y2 of the Y axis direction to one side Y1. For this reason, it is possible to release heat generated in the electro-optic panel 40 to the cooling air through the first light-transmissive plate 56.

In addition, in the heat radiation member 70, a plurality of concave portions 747 which are positioned on one side Y1 of the Y axis direction are formed on an outer surface (a surface of the other side Z2 of the Z axis direction) of the frame portion 74 positioned on one side Y1 of the Y axis direction, and the plurality of concave portions 747 are arranged at a predetermined interval in the X axis direction. For this reason, when the flow of the cooling air is generated along a surface of the other side Z2 of the Z axis direction of the electro-optic panel 40, the concave portions 747 and a portion interposed by the concave portions 747 act as a heat radiation fin. For this reason, when the heat generated in the electro-optic panel 40 is released to the heat radiation member 70, it is possible to efficiently release the heat from the frame portion 74 to the cooling air.

In addition, when the heat radiation member 70 is disposed on the other side Z2 of the Z axis direction with respect to the electro-optic panel 40, the outer peripheral side thin plate portions 711 and 721 of the heat radiation member 70 are overlapped with the plate-shaped portions 619 and 629 which face the frame portions 71 and 72 of the heat radiation member 70 in the X axis direction, among the frame portions 61 and 62 of the frame 60. Here, each of a spaced-apart distance in the Z axis direction between a surface 618 facing the frame portion 71 in the Z axis direction in the frame portion 61 and the frame portion 71, a spaced-apart distance in the Z axis direction between a surface 628 facing the frame portion 72 in the Z axis in the frame portion 62 and the frame portion 72, and a spaced-apart distance in the Z axis direction between a surface 638 facing the frame portion 73 in the Z axis direction in the frame portion 63 and the frame portion 73 is narrower than a spaced-apart distance in the Z axis direction between the frame portion 64 and the frame portion 74. Accordingly, when disposing the heat radiation member 70, if the surface 618 of the frame portion 61, the surface 628 of the frame portion 62, and the surface 638 of the frame portion 63 are coated with an anaerobic adhesive or a thermosetting adhesive 79 to be cured, the heat radiation member 70 and the frame 60 may be adhered to each other. As a result, the heat radiation member 70 and the frame 60 are in a state of holding the electro-optic panel 40 through the end plate portion 87 of the parting member 80 connected to the frame 60.

In this instance, a width of each of the surface 618 of the frame portion 61 and the surface 628 of the frame portion 62 is narrow, and the coated adhesive 79 spreads to the surroundings. In this case, the plate-shaped portion 619 is erected outside the surface 618 of the frame portion 61, and the plate-shaped portion 629 is erected outside the surface 628 of the frame portion 61. For this reason, when the adhesive spreads from the surfaces 618 and 628, leakage of the adhesive 79 is prevented by a narrow gap between an inner surface of the plate-shaped portion 619 of the frame 60 and an outer surface of the frame portion 71 of the heat radiation member 70, and a narrow gap between an inner surface of the plate-shaped portion 629 of the frame 60 and an outer surface of the frame portion 72 of the heat radiation member 70. Therefore, the adhesive 79 does not lead to the outside of the frame 60. In addition, when the adhesive 79 is intruded into the gap between the inner surface of the plate-shaped portion 619 of the frame 60 and an outer surface of the frame portion 71 of the heat radiation member 70 and the gap between the inner surface of the plate-shaped portion 629 of the frame 60 and an outer surface of the frame portion 72 of the heat radiation member 70, the heat radiation member 70 is also adhered to the inner surfaces of the plate-shaped portions 619 and 629 of the frame 60. Accordingly, the heat radiation member 70 may be firmly adhered and fixed to the frame 60.

In addition, on a surface 638 of the frame portion 63, the coated adhesive 79 spreads to the surroundings, but a width of the surface 638 is significantly wide compared to the surfaces 618 and 628. Accordingly, when the adhesive 79 is coated only along an inner edge of the surface 638, a distance until the adhesive 79 is leaked to the outside of the frame 60 is large, and therefore the adhesive 79 coated on the surface 638 is not leaked to the outside of the frame 60.

In addition, when the heat radiation member 70 and the frame 60 are adhered to each other by the adhesive 79, if holding the heat radiation member 70 and the frame 60 by a plate-shaped temporary fixing tool 90 until the adhesive 79 is cured as shown by a two-dot chain of FIG. 5, a process of adhering between the heat radiation member 70 and the frame 60 may be easily performed. Here, the plate-shaped temporary fixing tool 90 includes an end plate portion 95 that is superimposed on the heat radiation member 70 on the other side Z2 of the Z axis, and a side plate portion 91 that is bent toward one side Z1 of the Z axis direction from both ends of the X axis direction of the end plate portion 95, and an engagement hole 910 fitted to the projection 69 of the frame 60 is formed in the side plate portion 91. For this reason, when the temporary fixing tool 90 is disposed so that the end plate portion 95 covers the heat radiation member 70, and the engagement hole 910 of the side plate portion 91 is fitted to the projection 69, the heat radiation member 70 and the frame 60 may be temporarily fixed. In addition, simply by removing the engagement hole 910 of the side plate portion 91 from the projection 69, the temporary fixing tool 90 may be easily removed.

Main Effect of the Present Embodiment

As described above, in the electro-optic module 10 according to the present embodiment, on the second surface 51b (an opposite surface of the second substrate 52) of the first substrate 51, the first light-transmissive plate 56 is provided so as to be overlapped with the image display region 40a, and therefore dust is not adhered to a position (the first substrate 51) close to the electro-optic material layer 450 (the liquid crystal layer). Accordingly, even when projecting an image generated in the electro-optic panel 40, it is difficult that the image is affected by dust.

Here, the first light-transmissive plate 56 is provided so as to expose a part of the second surface 51b of the first substrate 51, and the heat radiation member 70 made of a material higher thermal conductivity than that of the first light-transmissive plate 56 is provided so as to be superimposed on least a part of the exposed portion from the first light-transmissive plate 56 of the first substrate 51 while contacting the at least the part thereof. For this reason, heat generated in the electro-optic panel 40 may be efficiently released through the heat radiation member 70. Therefore, it is possible to suppress a reduction in display quality caused by an increase in a temperature of the electro-optic panel 40. In addition, the heat radiation member 70 is made of a metal material, and has higher thermal conductivity than that of the first light-transmissive plate 56 (quartz glass). Therefore, the heat generated in the electro-optic panel 40 may be efficiently released through the heat radiation member 70.

In addition, the first light-transmissive plate 56 has a smaller size than that of the first substrate 51, and the end portions 561, 562, 563, and 564 of the first light-transmissive plate 56 are overlapped between the end portions 511, 512, 513, and 514 of the first substrate 51 over the whole periphery of the first light-transmissive plate 56 and the end portion of the image display region 40a. In addition, the rectangular frame portion 76 of the heat radiation member 70 is provided so as to surround the first light-transmissive plate 56 over the whole periphery. For this reason, an overlapped area between the exposed portion from the first light-transmissive plate 56 of the first substrate 51 and the heat radiation member 70 is large, and therefore the heat generated in the electro-optic panel 40 may be efficiently released through the heat radiation member 70. In addition, a quartz glass substrate smaller than the first substrate 51 is used as the first light-transmissive plate 56, and therefore a cost of the first light-transmissive plate 56 may be reduced.

In addition, according to the present embodiment, the heat radiation member 70 is an aluminum forged product, and therefore the inner peripheral side thin plate portion 77 constituting the parting portion of the light-emission side may be formed as being thin unlike a cast product, or the like.

More specifically, in a case of the forged product, the inner peripheral side thin plate portion 77 may be formed to be as thin as 0.2 mm or less, but in a case of the cast product, the inner peripheral side thin plate portion 77 may be formed to be as thin as 0.3 mm as a limit. For this reason, according to the present embodiment, when a flow of cooling air is generated along the other side Z2 of the Z axis direction of the electro-optic panel 40 by the intake fan 15B shown in FIGS. 1A and 1B or the like as shown by an arrow A, the cooling air enters the opening 78 (the opening 78 of the inner peripheral side thin plate portion 77 (partition)) of the heat radiation member 70 in an uninterrupted manner, and flows from the other side Y2 of the Y axis direction to one side Y1. Accordingly, the heat generated in the electro-optic panel 40 may be released to the cooling air through the first light-transmissive plate 56. In addition, the cooling air enters the opening 78 of the heat radiation member 70 in an uninterrupted manner, and therefore it is possible to prevent dust from being adhered to the first light-transmissive plate 56. On the other hand, in a case of the cast product, there is a limit in which the inner peripheral side thin plate portion 77 is thinned up to 3.0 mm, and therefore it is difficult to sufficiently obtain the above-described effects.

In addition, when the heat radiation member 70 is manufactured by forging, the plurality of concave portions 747 acting as the heat radiation fin may be efficiently formed. Accordingly, according to the present embodiment, the heat generated in the electro-optic panel 40 may be released to the cooling air through the first light-transmissive plate 56.

In addition, the end portions which face each other in the first light-transmissive plate 56 and the heat radiation member 70 are spaced apart. More specifically, the end portions 561, 562, 563, and 564 of the first light-transmissive plate 56 and the inner surface of the rectangular frame portion 76 (the frame portions 71, 72, 73, and 74) of the heat radiation member 70 are spaced apart. For this reason, even though the heat radiation member 70 is contracted due to a reduction in a temperature, the heat radiation member 70 does not impose a load to the first light-transmissive plate 56, and therefore deformation of the electro-optic panel 40 due to stress from the first light-transmissive plate 56 which is imposed on the electro-optic panel 40 may be avoided.

In addition, the heat radiation member 70 is overlapped on the exposed portion of the first substrate 51 which is the element substrate including a pixel electrode and a switching element, among the first substrate 51 and the second substrate 52. For this reason, when light is transmitted through the electro-optic panel 40, heat generation in the first substrate 51 rather than the second substrate 52 is large, but in the present embodiment, the heat radiation member 70 is overlapped with the exposed portion of the element substrate (the first substrate 51) having large heat generation, and therefore the heat generated in the electro-optic panel 40 may be efficiently released.

Another Configuration Example of Electro-Optic Module 10

Figure 9B:
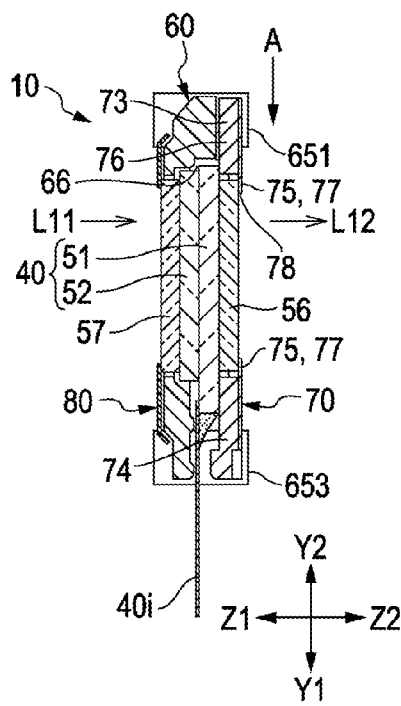
FIGS. 9A, 9B, and 9C are explanatory diagrams illustrating another configuration example of an electro-optic module used in a projection type display device to which the invention is applied.
Figure 9A:
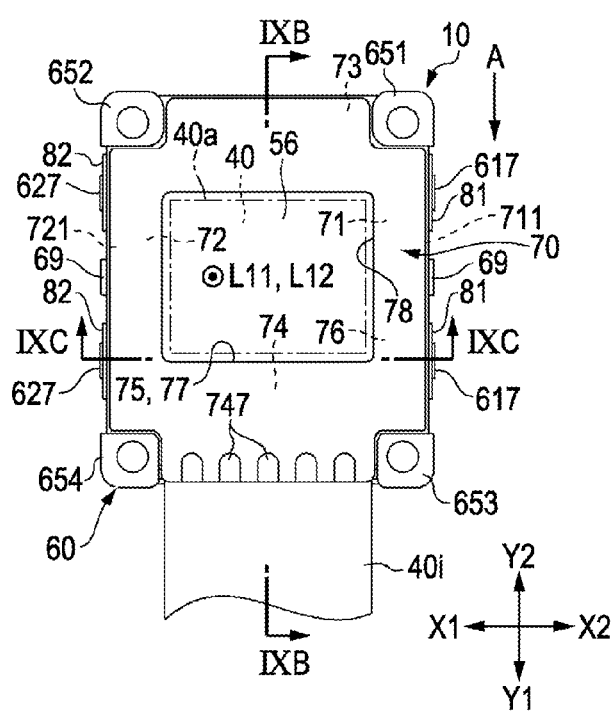
Figure 9C:
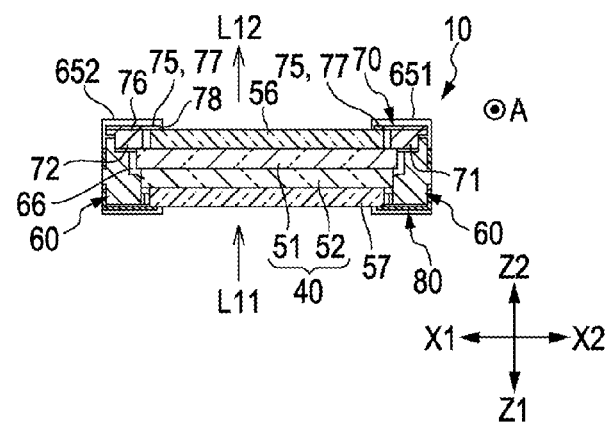

FIGS. 9A, 9B, and 9C are explanatory diagrams illustrating another configuration example of the electro-optic module 10 used in the projection type display device 1 to which the invention is applied. FIG. 9A is a plan view obtained when the electro-optic module is viewed from a light-emission side, FIG. 9B is an IXB-IXB cross-sectional view, and FIG. 9C is an IXC-IXC cross-sectional view. In addition, a basic configuration of the present embodiment is the same as that of the embodiment described with reference to FIGS. 4A to 8B, and therefore like reference numerals refer to like elements. In addition, repeated descriptions will be omitted.

In the embodiment described with reference to FIGS. 4A to 8B, the parting portion (the inner peripheral side thin plate portion 77) of the heat radiation member 70 is formed integrally with the heat radiation member 70, but as shown in FIGS. 9A, 9B and 9C, in the present embodiment, the inner peripheral side thin plate portion 77 of the heat radiation member 70 includes a plate-shaped parting member 75 adhered to the other side Z2 of the Z axis direction of the rectangular frame portion 76 of the heat radiation member 70. Here, the parting member 75 has a size superimposed on the whole of the rectangular frame portion 76 when viewed from the Z axis direction. According to the above-described configuration, the inner peripheral side thin plate portion 77 (the parting portion) is not required to be formed as a part of the heat radiation member 70, and therefore the heat radiation member 70 may be manufactured by casting or the like without being limited to forging.

In addition, according to the present embodiment, as in the embodiment described with reference to FIGS. 4A to 8B, the first light-transmissive plate 56 has a smaller size than that of the first substrate 51, and the rectangular frame portion 76 of the heat radiation member 70 is provided so as to surround the first light-transmissive plate 56 over the whole periphery. For this reason, the heat generated in the electro-optic panel 40 may be efficiently released through the heat radiation member 70. That is, the same effects as those of the embodiment described with reference to FIGS. 4A to 8B may be obtained.

Still Another Configuration Example of Electro-Optic Module

Figure 10B:
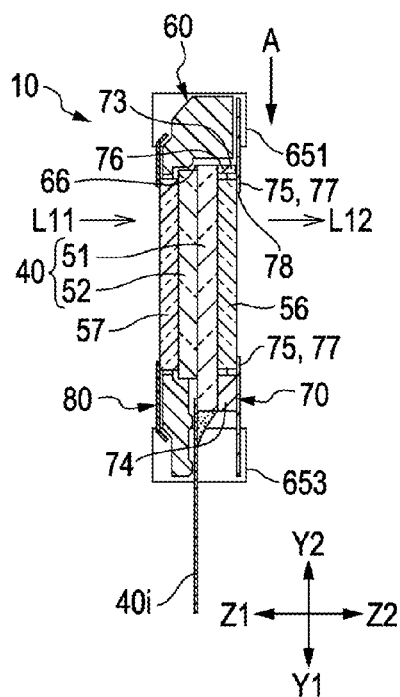
FIGS. 10A, 10B, and 10C are explanatory diagrams illustrating still another configuration example of an electro-optic module used in a projection type display device to which the invention is applied.
Figure 10A:
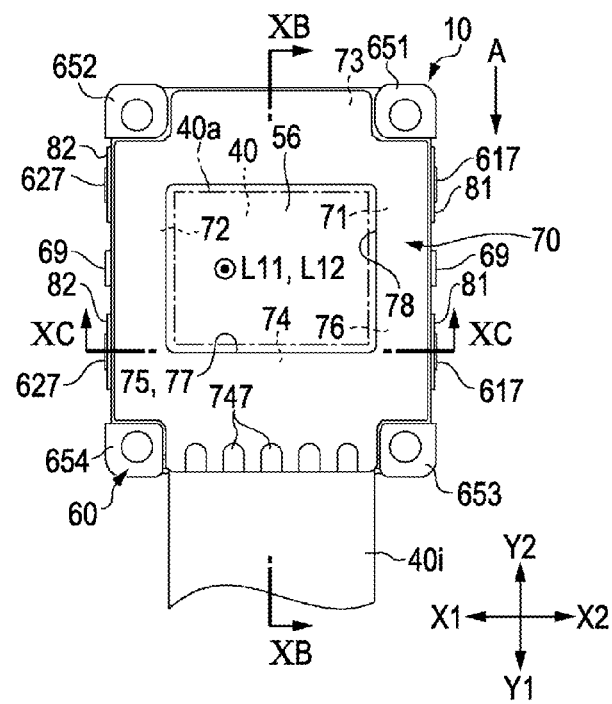
Figure 10C:
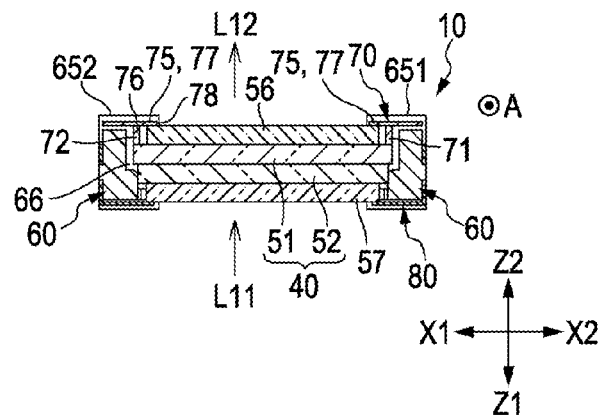

FIGS. 10A, 10B, and 10C are explanatory diagrams illustrating still another configuration example of the electro-optic module 10 used in the projection type display device 1 to which the invention is applied. FIG. 10A is a plan view when the electro-optic module is viewed from a light-emission side, FIG. 10B is an XB-XB cross-sectional view, and FIG. 10C is an XC-XC cross-sectional view. In addition, a basic configuration of the present embodiment is the same as that of the embodiment described with reference to FIGS. 4A to 9C, and therefore like reference numerals refer to like elements. In addition, repeated descriptions will be omitted.

As shown in FIGS. 10A, 10B and 10C, in the present embodiment, as in the embodiment described with reference to FIGS. 9A, 9B and 9C, the inner peripheral side thin plate portion 77 of the heat radiation member 70 includes a plate-shaped parting member 75 adhered to the other side Z2 of the Z axis direction of the rectangular frame portion 76 of the heat radiation member 70. Here, a dimension of an external appearance of the heat radiation member 70 is the same as that of the first substrate 51, and the heat radiation member 70 does not project outward from the end portions 511, 512, 513, and 514 of the first substrate 51.

According to the present embodiment, as in the embodiment described with reference to FIGS. 4A to 8B, the first light-transmissive plate 56 has a smaller size than that of the first substrate 51, and the rectangular frame portion 76 of the heat radiation member 70 is provided so as to surround the first light-transmissive plate 56 over the whole periphery. For this reason, the heat generated in the electro-optic panel 40 may be efficiently released through the heat radiation member 70. That is, the same effects as those of the embodiment described with reference to FIGS. 4A to 8B may be obtained.

Another Embodiment of Electro-Optic Module

In the above described embodiments, the electro-optic module 10 including the projection type electro-optic panel 40 has been exemplified, but the prevent invention may be applied to the electro-optic module 10 including the reflection type electro-optic panel 40.

In the above-described embodiments, as the projection type display device, a front surface projection type display device that performs projection from a direction in which a projection image is observed has been exemplified, but the present invention may be applied to the projection type display device which is used in a rear surface projection type display device that performs projection from an opposite side of the direction in which the projection image is observed.

In the above-described embodiments, the liquid crystal panel has been exemplified as the electro-optic panel, but the present invention is not limited thereto, and may be applied to the electro-optic module using organic electroluminescent display panels, plasma display panels, FED (Field Emission Display) panels, SED (Surface-Conduction Electron-Emitter Display) panels, LED (Light-Emission Diode) panels, electrophoretic display panels, or the like.

Other Electronic Apparatuses

The electro-optic module to which the present invention is applied may be used as a direct-view display device in electronic apparatuses such as a mobile phone, PDAs (Personal Digital Assistants), digital cameras, liquid crystal televisions, car navigation devices, television phones, POS terminals, devices including a touch panel other than the above-described electronic apparatus (the projection type display device).

This application claims priority from Japanese Patent Application No. 2011-208668 filed in the Japanese Patent Office on Sep. 26, 2011, the entire disclosure of which is hereby incorporated by reference in its entirely.

What is claimed is:
1. An electro-optic module comprising:
an electro-optic panel that includes a first light-transmissive substrate, a second light-transmissive substrate arranged so as to face the first light-transmissive substrate, and an electro-optic material layer provided between the first light-transmissive substrate and the second light-transmissive substrate;

a first light-transmissive plate that overlaps a side of the first light-transmissive substrate opposite to the second light-transmissive substrate in at least an image display region of the electro-optical panel in a state in which a portion of a surface of the side of the first light-transmissive substrate opposite to the second light-transmissive substrate is exposed; and a heat radiation member comprising
  a frame portion that overlaps the side of the first light-transmissive substrate opposite to the second light-transmissive substrate on at least a part of the exposed portion of the first light-transmissive substrate, and
  a parting portion that overlaps a surface of a side of the first light-transmissive plate opposite to the first light-transmissive substrate,
wherein
  the heat radiation member is made of a material higher in thermal conductivity than the first light-transmissive plate,
  the parting portion contacts the surface of the side of the first light-transmissive plate opposite to the first light-transmissive substrate,
  the frame portion contacts the side of the first light-transmissive substrate opposite to the second light-transmissive substrate, and
  end portions of the first light-transmissive plate and the heat radiation member which face each other are spaced apart from each other.

2. The electro-optic module according to claim 1, wherein the heat radiation member is made of a metal.

3. The electro-optic module according to claim 1, wherein the first light-transmissive plate has a smaller size than a size of the first light-transmissive substrate, an end portion of the first light-transmissive plate is arranged between an end portion of the first light-transmissive substrate and an end portion of the image display region over the whole periphery of the first light-transmissive plate in plan view, and the heat radiation member is provided so as to surround the whole periphery of the first light-transmissive plate.

4. The electro-optic module according to claim 1, wherein a thickness of the parting portion is smaller than a thickness of a portion that is overlapped with the exposed portion of the first light-transmissive substrate in the heat radiation member.

5. The electro-optic module according to claim 1, wherein on the second light-transmissive substrate side of the first light-transmissive substrate, a frame for supporting the electro-optic panel is provided between the first light-transmissive substrate and the heat radiation member so as not to be overlapped with the image display region.

6. The electro-optic module according to claim 5, further comprising:
  a second light-transmissive plate that is overlapped on an opposite side of the second light-transmissive substrate to the first light-transmissive substrate in the at least the image display region of the electro-optical panel in a state in which a part of an opposite side surface of the second light-transmissive substrate to the first light-transmissive substrate is exposed,
  wherein end portions of the second light-transmissive plate and the frame which face each other are spaced apart from each other.

7. The electro-optic module according to claim 1, wherein the first light-transmissive substrate is an element substrate including a pixel electrode and a switching element provided to correspond to the pixel electrode.

8. The electro-optic module according to claim 1, wherein the electro-optic panel is a liquid crystal panel including a liquid crystal layer as the electro-optic material layer.

9. An electronic apparatus that includes the electro-optic module according to claim 1, comprising:
  a light source unit that emits light supplied to the electro-optic module; and
  a projection optical system that projects light modulated by the electro-optic module.

10. The electro-optic module according to claim 5, wherein end portions of the first light-transmissive substrate and the frame which face each other are spaced apart from each other.

* * * * *